United States Patent [19]
Hwang

[11] Patent Number: 5,818,207
[45] Date of Patent: Oct. 6, 1998

[54] THREE-PIN BUCK CONVERTER AND FOUR-PIN POWER AMPLIFIER HAVING CLOSED LOOP OUTPUT VOLTAGE CONTROL

[75] Inventor: Jeffrey H. Hwang, Saratoga, Calif.

[73] Assignee: Micro Linear Corporation, San Jose, Calif.

[21] Appl. No.: 763,472

[22] Filed: Dec. 11, 1996

[51] Int. Cl.[6] .............................. G05F 1/40; G05B 24/02
[52] U.S. Cl. .......................................... 323/288; 323/351
[58] Field of Search ................................... 323/271, 282, 323/288, 351

[56] References Cited

U.S. PATENT DOCUMENTS

| | | | |
|---|---|---|---|
| 3,294,981 | 12/1966 | Bose | 307/88.5 |
| 3,603,809 | 9/1971 | Uchiyama | 307/228 |
| 3,660,753 | 5/1972 | Judd et al. | 323/22 T |

(List continued on next page.)

OTHER PUBLICATIONS

"Nonlinear–Carrier Control for High Power Factor Rectifiers Based On Flyback, Cuk, or Sepic Converters," R. Zane and D. Maksimovic, Applied Power Electronics Conf., pp. 814–820, 1996.

"Nonlinear–Carrier Control for High Power Factor Boost Rectifiers," D. Maksimovic, Y. Jang, R. Erikson, Applied Power Electronics Conf., pp. 635–641, 1995.

"ML4863 High Efficiency Flyback Controller", Micro Linear Corporation, Feb. 1995.

"ML4863EVAL User's Guide High Efficiency Flyback Controller", Micro Linear Corporation, Feb. 1995.

"Off–Line And One–Cell IC Converters Up Efficiency", Frank Goodenough, Electronic Design, pp. 55–56, 58, 60, 62–64, Jun. 27, 1994.

"Designing with hysteretic current–mode control", Gedaly Levin and Kieran O'Malley, Cherry Semi–Conductor Corp., EDN, pp. 95–96, 98, 100–102, Apr. 28, 1994.

"Analysis of the Flyback Converter Operating in Current–Mode Pulse–Frequency Modulation", Urs Mader and K. Kit Sum, Micro Linear Corporation, Apr. 17, 1994.

"Step–Up/Step Down Converters Power Small Portable Systems", Bruce D. Moore, EDN, pp. 79–84, Feb. 3, 1994.

"ML4861 Low Voltage Boost Regulator", Micro Linear Corporation, Jun. 1993.

(List continued on next page.)

Primary Examiner—Peter S. Wong
Assistant Examiner—Bao Q. Vu
Attorney, Agent, or Firm—Haverstock & Owens LLP

[57] ABSTRACT

A circuit for providing a regulated output voltage from a buck converter without directly monitoring the output voltage. The buck converter includes a switch having a first terminal coupled to a supply voltage and a second terminal coupled to a first terminal of an inductor and to a first terminal of a resistive divider. A second terminal of the inductor is coupled to a first capacitor for forming the output voltage across the first capacitor. A voltage formed by the resistive divider is applied to an inverting input of a transconductance amplifier, while a reference voltage is applied to a non-inverting input of the transconductance amplifier. An output of the transconductance amplifier is coupled to a second capacitor for forming an error signal across the second capacitor. The error signal is representative of a difference between the output voltage and a desired output voltage because an average of the voltage formed by the resistive divider is representative of the output voltage. The error signal is compared to a periodic ramp signal by a comparator for forming a switch control signal. Therefore, circuit regulates the output voltage in a feedback loop by monitoring a voltage on the first terminal of the inductor rather than directly monitoring the output voltage. When the circuit is implemented in an integrated circuit package, this results in a savings of one pin. In another aspect, a variable signal is added to, or replaces, the reference voltage such that the circuit functions as a power amplifier.

42 Claims, 8 Drawing Sheets

OTHER PUBLICATIONS

| | | | |
|---|---|---|---|
| 3,883,756 | 5/1975 | Dragon | 307/265 |
| 4,311,954 | 1/1982 | Capel | 323/222 |
| 4,392,103 | 7/1983 | O'Sullivan et al. | 323/222 |
| 4,407,588 | 10/1983 | Arichi et al. | 368/118 |
| 4,422,138 | 12/1983 | Kornrumpf | 323/282 |
| 4,437,146 | 3/1984 | Carpenter | 363/21 |
| 4,454,558 | 6/1984 | Huddart | 323/282 |
| 4,456,872 | 6/1984 | Froeschle | 323/286 |
| 4,529,927 | 7/1985 | O'Sullivan et al. | 323/222 |
| 4,651,231 | 3/1987 | Douglas, Jr. | 358/342 |
| 4,672,303 | 6/1987 | Newton | 323/285 |
| 4,672,518 | 6/1987 | Murdock | 363/21 |
| 4,674,020 | 6/1987 | Hill | 363/21 |
| 4,677,366 | 6/1987 | Wilkinson et al. | 323/222 |
| 4,691,159 | 9/1987 | Ahrens et al. | 323/222 |
| 4,731,574 | 3/1988 | Melbert | 323/275 |
| 4,736,151 | 4/1988 | Dishner | 323/224 |
| 4,761,725 | 8/1988 | Henze | 363/46 |
| 4,837,495 | 6/1989 | Zansky | 323/222 |
| 4,841,220 | 6/1989 | Tabisz et al. | 323/282 |
| 4,845,420 | 7/1989 | Oshizawa et al. | 323/222 |
| 4,920,309 | 4/1990 | Szepesi | 323/269 |
| 4,929,882 | 5/1990 | Szepesi | 323/222 |
| 4,940,929 | 7/1990 | Williams | 323/222 |
| 4,941,080 | 7/1990 | Sieborger | 363/127 |
| 4,947,309 | 8/1990 | Jonsson | 363/17 |
| 4,975,823 | 12/1990 | Rilly et al. | 363/56 |
| 5,028,861 | 7/1991 | Pace et al. | 323/222 |
| 5,034,873 | 7/1991 | Feldtkeller | 363/21 |
| 5,138,249 | 8/1992 | Capel | 323/283 |
| 5,146,399 | 9/1992 | Gucyski | 363/89 |
| 5,278,490 | 1/1994 | Smedley | 323/284 |
| 5,359,281 | 10/1994 | Barrow et al. | 323/284 |
| 5,397,976 | 3/1995 | Madden et al. | 323/282 |
| 5,412,308 | 5/1995 | Brown | 323/267 |
| 5,414,341 | 5/1995 | Brown | 323/268 |
| 5,434,767 | 7/1995 | Batarseh et al. | 363/16 |
| 5,440,473 | 8/1995 | Ishii et al. | 363/21 |
| 5,450,000 | 9/1995 | Olsen | 323/222 |
| 5,457,621 | 10/1995 | Munday et al. | 363/56 |
| 5,457,622 | 10/1995 | Arakawa | 363/59 |
| 5,461,302 | 10/1995 | Garcia et al. | 323/222 |
| 5,477,132 | 12/1995 | Canter et al. | 323/282 |
| 5,479,089 | 12/1995 | Lee | 323/283 |
| 5,481,178 | 1/1996 | Wilcox et al. | 323/287 |
| 5,485,361 | 1/1996 | Sokal | 363/21 |
| 5,491,445 | 2/1996 | Moller et al. | 327/540 |
| 5,502,370 | 3/1996 | Hall et al. | 323/284 |
| 5,532,577 | 7/1996 | Doluca | 323/282 |
| 5,552,695 | 9/1996 | Schwartz | 323/271 |
| 5,565,761 | 10/1996 | Hwang | 323/222 |
| 5,568,041 | 10/1996 | Hesterman | 323/207 |
| 5,570,276 | 10/1996 | Cuk et al. | 323/266 |
| 5,592,071 | 1/1997 | Brown | 323/282 |
| 5,592,128 | 1/1997 | Hwang | 331/61 |
| 5,610,502 | 3/1997 | Tallant, II et al. | 323/222 |
| 5,617,306 | 4/1997 | Lai et al. | 363/17 |
| 5,627,460 | 5/1997 | Bazinet et al. | 323/288 |
| 5,691,889 | 11/1997 | Bazinet et al. | 363/89 |

OTHER PUBLICATIONS

"11. Variable Frequency Converters", K. Kit Sum, pp. 96–97, 134–135, 1993.

"3.3V/5V/Adjustable Output, Step–Up, DC–DC Converters", Maxim Integrated Products, pp. 1–8, 1993.

"ML4821 Power Factor Controller," Micro Linear Corporation, Jun. 1992.

"Application Note 16—Theory and Application of the ML4821 Average Current Mode PFC Controller," Micro Linear Corporation, Jan. 1992.

"Small–Signal High–Frequency Analysis Of The Free–Running Current–Mode–Controlled Converter", Richard Redl, pp. 897–906, IEEE, 1991.

"Low–Voltage–Input, 3V/3.3V/5V/Adjustable–Output, Step–Up DC–DC Converters", Maxim Integrated Products, pp. 4–189 to 4–191 (no date).

"LT1073 Micropower DC–DC Converter Adjustable and Fixed 5V, 12V", Linear Technology, pp. 4–174 to 4–189, 4–192, (no date).

"System–Engineered Portable Power Supplies Marry Improved Efficiency And Lower Cost", Bruce D. Moore, Maxim Integrated Products (no date).

"ML 4823 High Frequency Power Supply Controller," Micro Linear Corporation, Dec. 1994.

"CD 54/74 HC 4046A Technical Data," RCA, (no date).

"ML4863 High Efficiency Battery Pack Converter (Preliminary)", Micro Linear Corporation, Jun. 1994.

"ML 4880 Portable PC/PCMCIA Power Controller (Preliminary)", Micro Linear Corporation, Oct. 1995.

THREE-PIN BUCK CONVERTER AND FOUR-PIN POWER AMPLIFIER HAVING CLOSED LOOP OUTPUT VOLTAGE CONTROL

FIELD OF THE INVENTION

The invention relates to the field of buck converters. More particularly, the invention relates to buck converters having an output voltage regulated in a closed feedback loop without directly monitoring the output voltage.

BACKGROUND OF THE INVENTION

Figure 1:
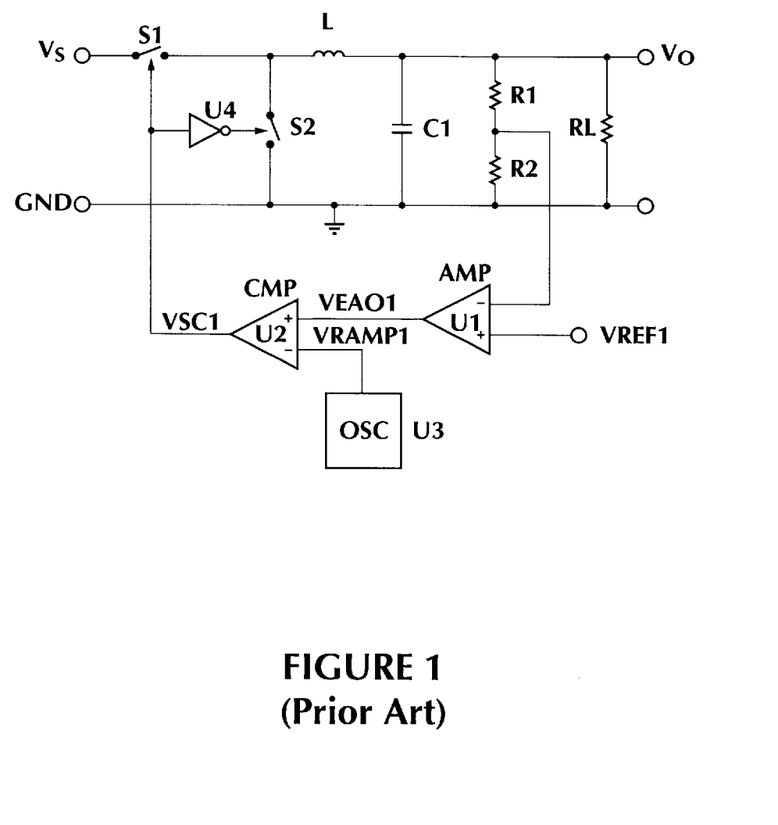
FIG. 1 illustrates a prior art buck converter circuit for providing a regulated output voltage.

In a typical buck regulator, the output voltage is regulated by monitoring a level of the output voltage, comparing that monitored level to a predetermined desired level and developing a response to that comparison to minimize a difference between the monitored level and the predetermined desired level. FIG. 1 illustrates a typical buck converter circuit for providing a regulated output voltage. Referring to FIG. 1, a supply voltage node Vs is coupled to a first terminal of a switch S1. A second terminal of the switch S1 is coupled to a first terminal of a switch S2 and to a first terminal of an inductor L. A second terminal of the inductor L is coupled to a first terminal of a capacitor C1, forming an output node Vo, and to a first terminal of a resistor RI. A second terminal of the switch S2 and a second terminal of the capacitor C1 are coupled to a ground node. A load RL can be coupled across the capacitor C1.

A second terminal of the resistor RI is coupled to a first terminal of a resistor R2 and to an inverting input of an amplifier U1. A second terminal of the resistor R2 is coupled to the ground node. A reference voltage VREF1 is coupled to a non-inverting input of the amplifier U1. An output of the amplifier U1 forms an error signal VEAO1 which is coupled to a non-inverting input of a comparator U2. A oscillator U3 generates a periodic ramp signal VRAMP1 having a fixed frequency which is coupled to an inverting input of the comparator U2. An output of the comparator U2 forms a signal VSC1 which is coupled to control the switch S1. The signal VSC1 is inverted by an inverter U4 for controlling the switch S2.

Figure 2:
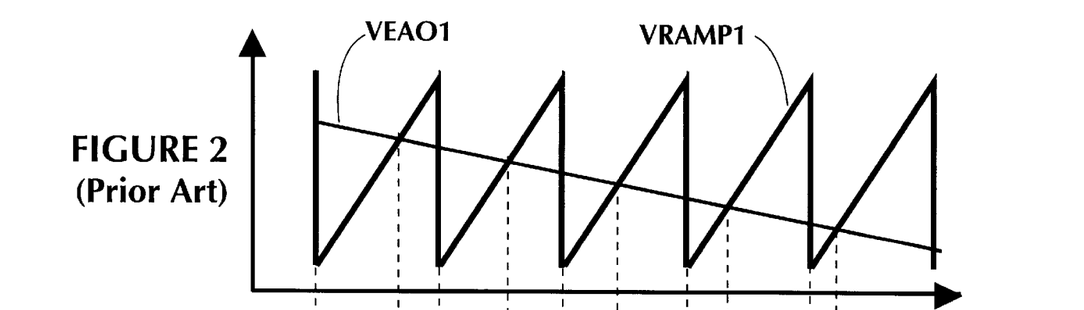
FIG. 2 illustrates a timing diagram for the signal VRAMP1 and the signal VEAO1 of the circuit illustrated in FIG. 1.
Figure 3:
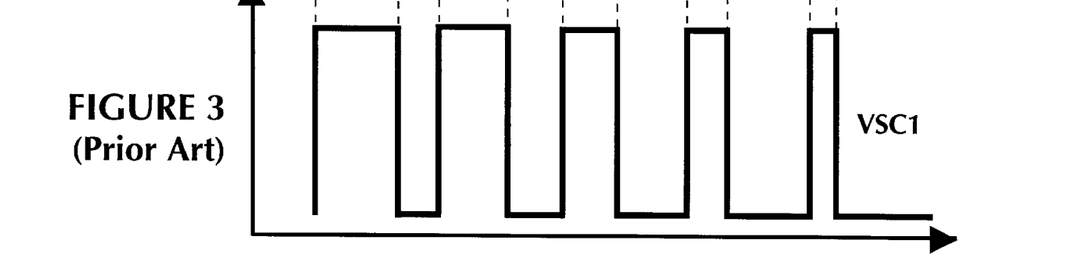
FIG. 3 illustrates a timing diagram for the signal VSC1 of the circuit illustrated in FIG. 1.

FIG. 2 illustrates a timing diagram for the signal VRAMP1 and the signal VEAO1. FIG. 3 illustrates a timing diagram for the signal VSC1. Referring to FIGS. 1–3, when the signal VSC1 is logical high voltage, the switch S1 is closed and the switch S2 is open. When the switches S1 and S2 are in this condition, a current from the supply node Vs charges the inductor L with energy. When the signal VSC1 is a logical low voltage, the switch S1 is open and the switch S2 is closed. Therefore, energy stored in the inductor L is transferred to the capacitor C1. By alternately closing and opening the switches S1 and S2 in this manner, an output voltage can be formed across the capacitor C1 which can be applied to the load RL. The amount of energy stored in the inductor L and transferred to the capacitor C1 can be controlled by adjusting the time period during which the switch S1 is closed.

A resistive divider comprising the resistors R1 and R2 forms a voltage that is a portion of the output voltage across the capacitor C1. A difference between the reference voltage VREF1 and the voltage formed by the resistive divider is amplified by the amplifier U1, forming the error signal VEAO1. The error signal VEAO1 is compared to the ramp signal VRAMP1 by the comparator U2, forming the signal VSC1. Accordingly, if the voltage across the capacitor C1 increases, the signal VEAO1 decreases. This reduces the duty cycle of the signal S1 such that the amount of energy transferred to the capacitor C1 is reduced, thereby reducing the voltage across the capacitor C1. If the voltage across the capacitor C1 decreases, the signal VEAO1 increases. This increases the duty cycle of the signal S1 such that the amount of energy transferred to the capacitor C1 is increased, thereby increasing the voltage across the capacitor C1. Therefore, the output voltage at the node Vo is regulated in a feedback loop to remain at a constant level.

Because the duty cycle of the signal VSC1 is controlled by monitoring the output voltage, a feedback path, such as through the resistive divider, is required to be coupled to the output node Vo. When such a circuit is implemented in an integrated circuit, this feedback path requires a dedicated pin of the integrated circuit package. The size and cost of an integrated circuit, however, increases as the number of pins increases. Further, the inductor L and capacitor C1 in the feedback loop can contribute to instability of the feedback loop. Additional components can be required to counteract this effect. It is therefore desired to provide a regulated output voltage without requiring a feedback path coupled to the output node Vo.

SUMMARY OF THE INVENTION

The invention is a circuit for providing a regulated output voltage from a buck converter without directly monitoring the output voltage. The buck converter includes a first switch having a first terminal coupled to a supply voltage node. A second terminal of the first switch is coupled to a first terminal of a second switch, to a first terminal of an inductor and to a first terminal of a resistive divider. A second terminal of the inductor is coupled to a first terminal of a first capacitor. A second terminal of the second switch, a second terminal of the resistive divider and a second terminal of the first capacitor are coupled to a ground node.

When a switch control signal causes the first switch to be closed and the second switch to be open, a current from the supply node charges the inductor with energy. The amount of energy stored in the inductor can be controlled by adjusting the time period during which the first switch is closed. When the first switch is open and the second switch is closed, the energy stored in the inductor is transferred to the first capacitor. By alternately opening and closing the switches at appropriate times, a desired output voltage can be formed across the first capacitor.

A voltage formed by the resistive divider is applied to a non-inverting input of a transconductance amplifier, while a predetermined reference voltage is applied to an inverting input of the transconductance amplifier. An output of the transconductance amplifier is coupled to charge a second capacitor for forming an error signal across the second capacitor. The error signal is representative of a difference between the actual output voltage and a desired output voltage because an average of the voltage formed by the resistive divider is representative of the output voltage. The error signal is compared to a periodic ramp signal by a comparator for forming the switch control signal.

If the voltage formed across the second capacitor increases, this is representative of a decrease in the output voltage. Therefore, the duty cycle of the switch control signal is increased. If the voltage formed across the second capacitor decreases, this is representative of an increase in the output voltage. Therefore, the duty cycle of the switch control signal is decreased. Accordingly, the circuit regulates the output voltage in a feedback loop without directly monitoring the output voltage. Rather, a voltage on the first terminal of the inductor is monitored and signal representative of a time average of this voltage is formed. When the circuit is implemented in an integrated circuit package, this results in a savings of one pin. Further, because the inductor and the first capacitor are not in the feedback loop, they do not adversely affect the stability of the feedback loop.

In another aspect of the invention, a variable signal is added to, or replaces, the predetermined reference voltage. Because the output voltage responds to the variable signal, the circuit functions as a power amplifier. In an exemplary application, the variable signal can be an audio signal while a speaker can be coupled to the output node as a load for reproducing sounds associated with the audio signal.

DETAILED DESCRIPTION OF THE PREFERRED EMBODIMENT

Figure 4:
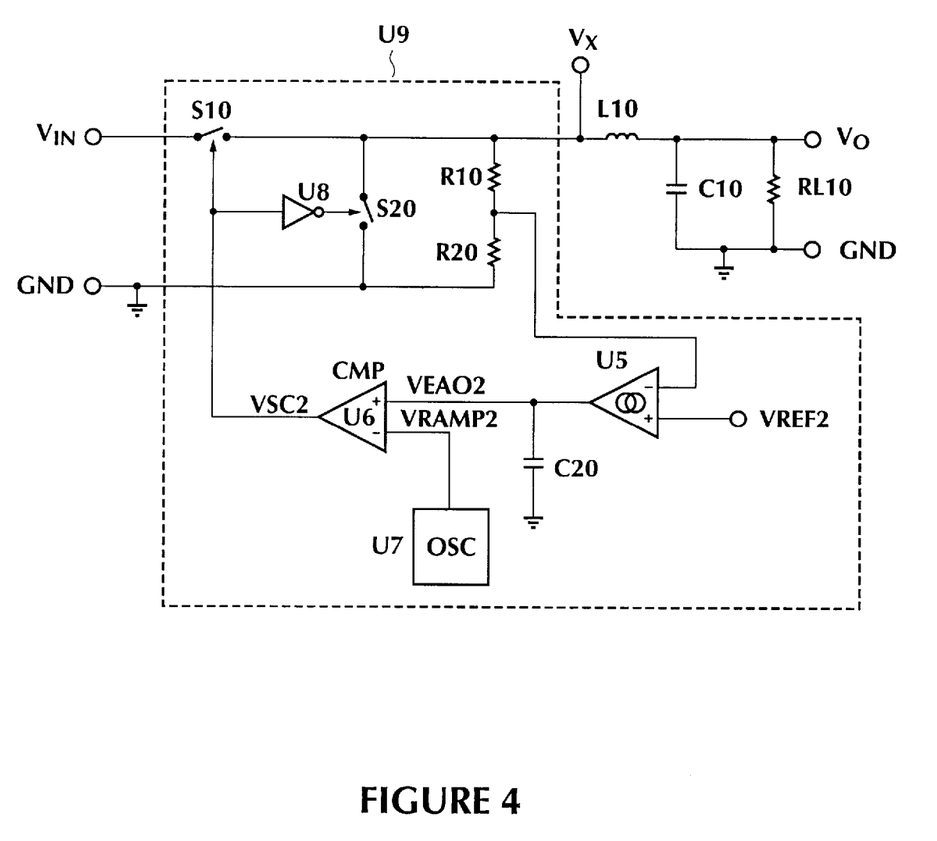
FIG. 4 illustrates a buck converter circuit according to the present invention.

FIG. 4 illustrates a buck converter circuit according to the present invention. Referring to FIG. 4, a voltage supply node Vin is coupled to a first terminal of a switch S10. A second terminal of the switch S10 is coupled to a first terminal of a switch S20, to a first terminal of a resistor R10 and to a first terminal of an inductor L10, forming a node Vx. A second terminal of the resistor R10 is coupled to a first terminal of a resistor R20 and to an inverting input of a transconductance amplifier U5. A second terminal of the inductor L10 is coupled to a first terminal of a capacitor C10. A second terminal of the switch S20, a second terminal of the resistor R20 and a second terminal of a capacitor C10 are coupled to the ground node. A load RL10 can be coupled across the capacitor C10.

A predetermined reference voltage VREF2 is coupled to a non-inverting input of the transconductance amplifier U5. An output of the transconductance amplifier U5 forms an error signal VEAO2 and is coupled to a first terminal of a capacitor C20 and to a non-inverting input of a comparator U6. A second terminal of the capacitor C20 is coupled to the ground node. An oscillator U7 forms a periodic ramp signal VRAMP2 which is coupled to an inverting input of the comparator U6. An output of the comparator U6 forms a switch control signal VSC2 and is coupled to control the switch S10 and to an input of an inverter U8. An output of the inverter U8 is coupled to control the switch S20.

The switches S10 and S20 are controlled by the switch control signal VSC2 such that when the switch control signal VSC2 is a logical high voltage, the switch S10 is in a closed condition and the switch S20 is in an open condition. When the switch control signal VSC2 is a logical low voltage, the switch S10 is in an open condition and the switch S20 is in a closed condition. It will be apparent that the switch S20 could be replaced with a diode having its anode coupled to the ground node and its cathode coupled to the node Vx. It will also be apparent that each of the switches S10 and S20 can be a bipolar transistor, a field effect transistor or a mechanical switch.

When the switch S10 is closed, the switch S20 is open and current from a supply coupled to the supply node Vin charges the inductor L10 with energy. Within limits, the amount of energy stored in the inductor L10 can be controlled by adjusting the time during which the switch S10 is held closed and the switch S20 is held open. At an appropriate time, the switch S10 can be opened and the switch S20 closed such that the energy stored in the inductor L10 is transferred to the capacitor C10, forming a voltage across the capacitor C10. By alternately opening and closing the switches S10 and S20 at appropriate times, the voltage across the capacitor C10 can be regulated.

The output voltage at the node Vout is approximately equal to the voltage at the input node Vin multiplied by the duty cycle of the switch control signal VSC2. For example, if the voltage at the input node Vin is 10 volts and the duty cycle of the switch control signal VSC2 is 75%, such that the switch S10 is closed 75% of the time, the output voltage at the node Vout will be 75% of the voltage at the input node Vin, or 7.5 volts. Therefore, the output voltage at the node Vout is approximately equal to an average of the voltage at the node Vx over time.

The resistive divider forms a signal that is a portion of the voltage at the node Vx. This signal is applied to the inverting input of the transconductance amplifier U5. At times when the signal formed by the resistive divider is greater than the reference voltage VREF2, the transconductance amplifier U5 draws a current from the capacitor C20 that is proportional to the difference between the voltage formed by the resistive divider and the voltage VREF2. Conversely, at times when the signal applied to the inverting input of the transconductance amplifier U5 is lower than the reference voltage VREF2, the transconductance amplifier charges the capacitor C20 with a current that is proportional to the difference between the voltage formed by the resistive divider and the voltage VREF2.

The reference voltage VREF2 is representative of a desired output voltage level. Therefore, the voltage VEA02 across the capacitor C20 is representative of an average difference between the voltage at the node Vx and the reference voltage VREF2 over time. Accordingly, the voltage VEA02 across the capacitor C20 is representative of a difference between the output voltage at the node Vout and the desired output voltage level.

Figure 5:
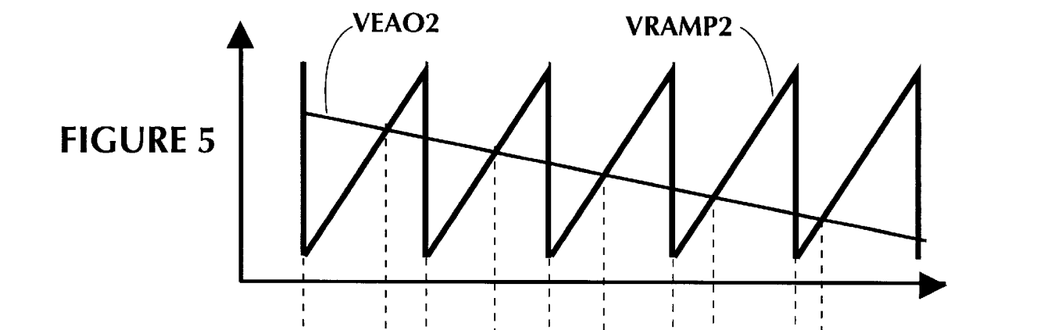
FIG. 5 illustrates a timing diagram for the signal VRAMP2 and the signal VEAO2 of the circuit illustrated in FIG. 4.
Figure 6:
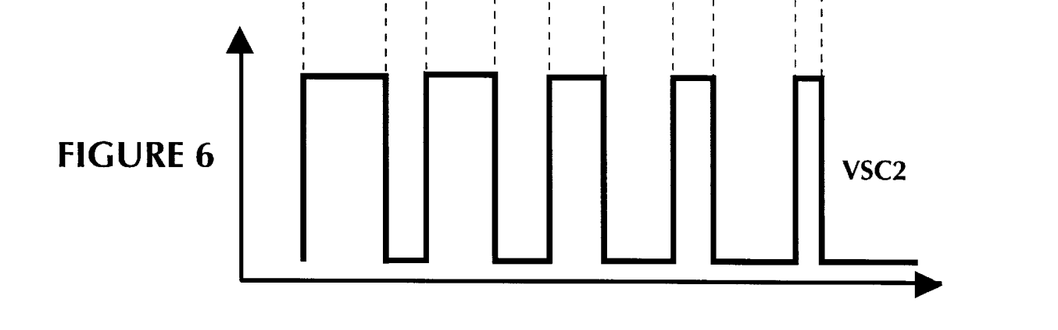
FIG. 6 illustrates a timing diagram for the signal VSC2 of the circuit illustrated in FIG. 4.

The signal VEA02 is compared to a periodic ramp signal VRAMP2 by the comparator U6 for forming the switch control signal VSC2. FIG. 5 illustrates a timing diagram for the signal VEA02 and the signal VRAMP2. Preferably, the ramp signal VRAMP2 has a fixed frequency in the range of approximately 50 kHz to 500 kHz. FIG. 6 illustrates a timing diagram for the switch control signal VSC2. Referring to FIGS. 4–6, when the average voltage at the node Vx decreases, indicating a decrease in the output voltage at the node Vout, the voltage VEAO2 across the capacitor C20 increases. This results in an increase in the duty cycle for the switch control signal VSC2 such that the switch S10 remains closed longer. Because the switch S10 is closed longer, more energy is transferred to the capacitor C10 thereby increasing the output voltage at the node Vout. When the average voltage at the node Vx increases, indicating an increase in the output voltage at the node Vout, the voltage VEAO2 across the capacitor C20 decreases. This results in a decrease in the duty cycle for the switch control signal VSC2 such that the switch S10 remains closed for a shorter time. Because the switch S10 is closed for a shorter time, less energy is transferred to the capacitor C10 thereby allowing the output voltage at the node Vout to decrease. Therefore, by controlling an average voltage at the node Vx in a closed feedback loop, the output voltage at the node Vout is regulated in a closed feedback loop without directly monitoring the output voltage.

It will be apparent that the polarities of the inputs of the transconductance amplifier U5 can be reversed along with the polarities of the inputs of the comparator U6 to achieve the objects of the present invention.

The output voltage at the node Vout will generally be somewhat lower than the voltage at the input node Vin multiplied by the duty cycle of the switch control signal VSC2 due to losses. For example, the on-resistance of the switch S10 and resistance of the inductor L10 will result in the output voltage being somewhat lower than expected. These losses, however, can be compensated for by adjusting the level of the predetermined reference voltage VREF2.

Because the voltage at the node Vx, rather than the output voltage at the node Vout, is monitored for regulating the output voltage, when a circuit for controlling a buck converter according to the present invention is implemented in an integrated circuit package, a pin is not required for coupling circuits internal to the integrated circuit to monitor the output voltage. Therefore, as illustrated by the dotted line in FIG. 4, an integrated circuit U9 can be implemented to include the switches S10 and S20 and a circuit for controlling the average voltage at the node Vx in a closed loop, such as the transconductance amplifier U5, the capacitor C20, the comparator U6, the oscillator U7 and the inverter U8. The inductor L10 and the capacitor C10 can be external to the integrated circuit U9. The resistors R10 and R20 are preferably formed as part of the integrated circuit U9, but could be discrete components external to the integrated circuit U9 or could be a potentiometer. Accordingly, the integrated circuit U9 requires only three pins; a first pin for the supply node Vin, a second pin for the ground node GND and a third pin for the node Vx.

Alternately, the elements inside the dotted line can be implemented in an integrated circuit that includes other circuits and functions. In such a case, the other circuits would require a pin for a voltage supply and a pin for ground, in addition to any other pins for receiving or transmitting signals. Therefore, the addition of the buck converter controller according to the present invention to such an integrated circuit would only require one additional pin for coupling the node Vx to an external inductor, as illustrated in FIG. 4.

By duplicating circuits internal to the integrated circuit U9, multiple regulated outputs can be provided by increasing the number of pins by only one for each additional regulated output. For example, an integrated circuit having two regulated outputs can be implemented with only four pins and an integrated circuit having three regulated outputs can be implemented with only five pins.

Figure 7:
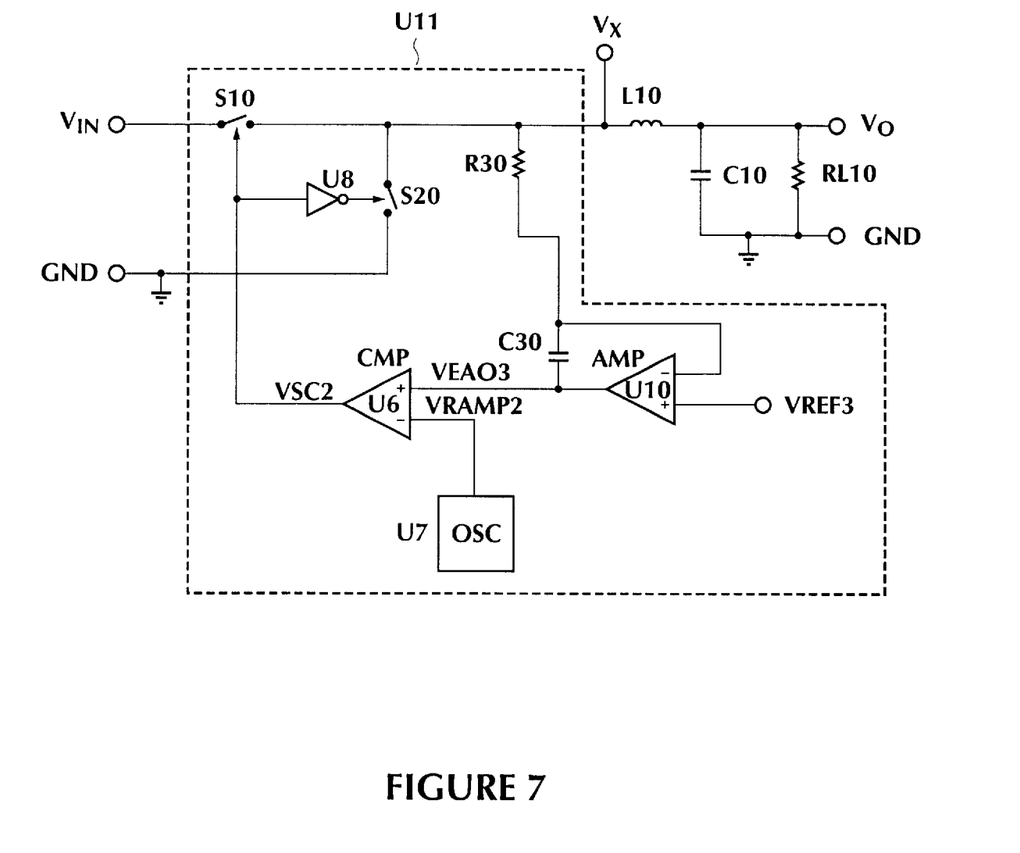
FIG. 7 illustrates a schematic diagram of a first alternate embodiment of a buck converter according to the present invention.

FIG. 7 illustrates a schematic diagram of a first alternate embodiment of a buck converter according to the present invention. Like circuit elements performing like functions are identified with the same reference numerals. Rather than utilizing the resistors R10 and R20, the transconductance amplifier U5 and the capacitor C20, as in FIG. 4, the circuit illustrated in FIG. 7 utilizes a resistor R30, an operational amplifier U10 and a capacitor C30. A first terminal of the resistor R30 is coupled to the node Vx. A second terminal of the resistor R30 is coupled to a first terminal of the capacitor C30 and to an inverting input of the operational amplifier U10. A non-inverting input of the operational amplifier U10 is coupled to a reference voltage VREF3. An output of the operational amplifier U10 is coupled to a second terminal of the capacitor C30 and to the non-inverting input of the comparator U6.

At times when the signal applied to the inverting input of the amplifier U10 is greater than the reference voltage VREF3, the amplifier U10 reduces the voltage VEAO3 formed at the second terminal of the capacitor C20. Conversely, at times when the signal applied to the inverting input of the amplifier U10 is lower than the reference voltage VREF3, the amplifier U10 increases the voltage VEAO3 at the second terminal of the capacitor C20. The reference voltage VREF3 is representative of a desired output voltage level. Therefore, the voltage VEAO3 is representative of an average difference between the voltage at the node Vx and the reference voltage VREF3 over time. Accordingly, the voltage VEAO3 is representative of a difference between the output voltage at the node Vout and the desired output voltage level. The signal VEAO3 is compared to the periodic ramp signal VRAMP2 by the comparator U6 for forming the switch control signal VSC2.

It will be apparent that the polarities of the inputs of the operational amplifier U10 can be reversed along with the polarities of the inputs of the comparator U6 to achieve the objects of the present invention. Further, it will be apparent that the operational amplifier U10 can be replaced with an internally compensated amplifier. In which case, the capacitor C30 can be a compensation element internal to the amplifier and need not be a separate element.

Figure 8:
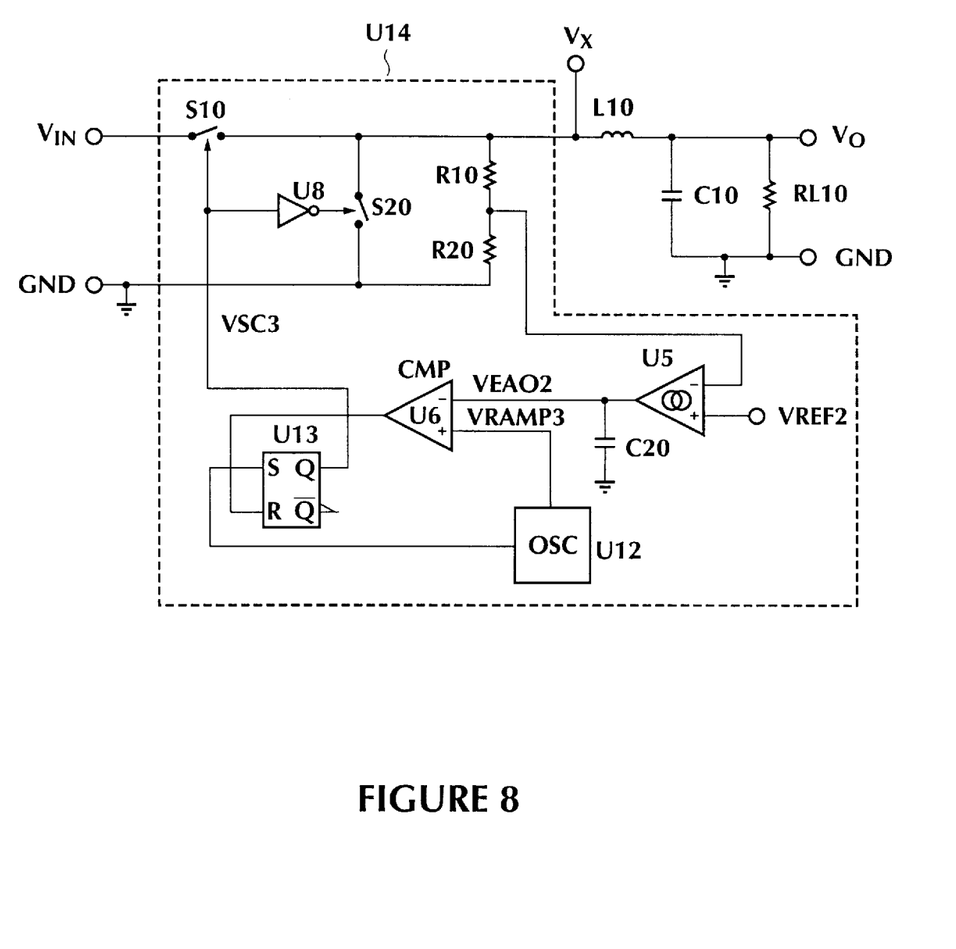
FIG. 8 illustrates a schematic diagram of a second alternate embodiment of a buck converter according to the present invention.

FIG. 8 illustrates a schematic diagram of a second alternate embodiment of a buck converter according to the present invention. Like circuit elements performing like functions are identified with the same reference numerals. Rather than having the output of the comparator U6 coupled directly to the switch S10 and to the inverter U8 as in FIG. 4, FIG. 8 illustrates a reset input R of a flip-flop U13 coupled to the output of the comparator U6. In addition, an oscillator U12 provides a ramp signal VRAMP3 and a clock signal VCLK. The clock signal VCLK is coupled to a set input S of the flip-flop U13. An output Q of the flip-flop U13 is coupled to control the switch S10 and to the input of the inverter U8. An output of the inverter U8 is coupled to control the switch S20.

Alternately, the inverter U8 can be omitted and a $\overline{Q}$ output of the flip-flop U 13 can be coupled to control the switch S20. In addition, it will be apparent that the polarities of the inputs of the transconductance amplifier U5 can be reversed along with the polarities of the inputs of the comparator U6, the output of the comparator U6 can be coupled to the set S input of the flip-flop U13, and the clock signal VCLK can be coupled to the reset input R of the flip-flop U13, to achieve the objects of the present invention.

Figure 9:
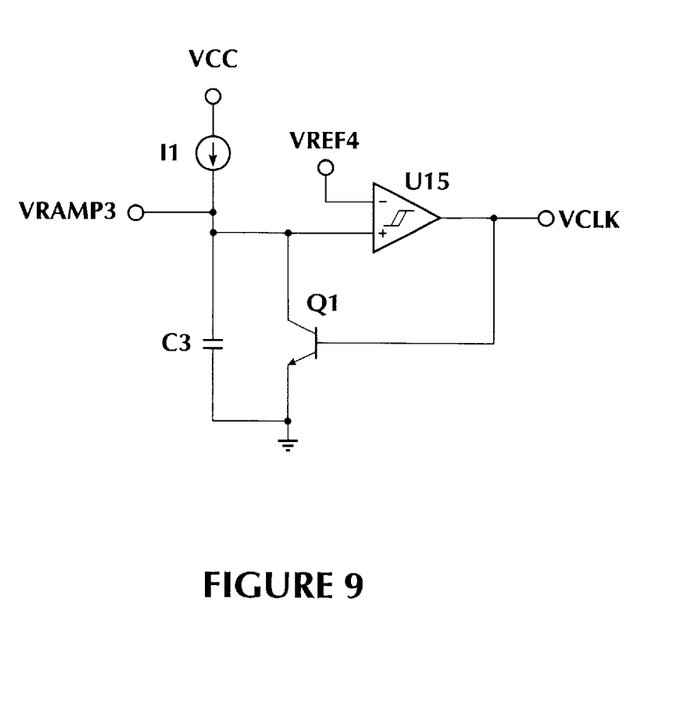
FIG. 9 illustrates a schematic diagram of the oscillator circuit illustrated in FIG. 8.

FIG. 9 illustrates a schematic diagram of the oscillator circuit U12 illustrated in FIG. 8. A supply voltage node VCC is coupled to a first terminal of a current source I1. A second terminal of the current source I1 is coupled to a first terminal of a capacitor C3, to a collector of an npn bipolar transistor Q1 and to a non-inverting input of an hysteretic comparator U15, forming a node VRAMP3. A second terminal of the capacitor C3 and an emitter of the transistor Q1 are coupled to the ground node. A base of the transistor Q1 is coupled to an output of the comparator U15, forming a node VCLK. A reference voltage level VREF4 is coupled to an inverting input of the comparator U15.

The level of voltage at the node VREF4 is higher than the ground level and represents a maximum amplitude for the signal formed at the node VRAMP3. When the output of the comparator U15 is a logical high voltage, the transistor Q1 is turned on, bringing the voltage level at the node VRAMP3 to near the ground level. This causes the output of the comparator U15 to fall to a logical low voltage. Because the comparator U15 is hysteretic, its output does not fall until the capacitor C3 has discharged. Then, the current source I1 begins charging the capacitor C3 with a current, causing the voltage at the node VRAMP3 to rise such that it has a positive slope that is substantially linear. When the voltage at the node VRAMP3 rises above the reference voltage VREF4, the output of the comparator U15 rises to a logical high voltage, turning the transistor Q1 on again, and the cycle repeats.

The oscillator U12 differs from the oscillator U7 illustrated in FIG. 4 in that in FIG. 4, the clock signal is not required. The signal VRAMP3 generated by the oscillator U12 is designed to be identical to the signal VRAMP2 illustrated in FIG. 5. Note, however, that other oscillator circuits can be utilized to achieve the present invention. For example, an oscillator can be utilized that generates a periodic ramp signal having a negative slope over each period as opposed to the signal VRAMP2 or VRAMP3 which has a positive slope over each period.

Referring to FIG. 8, the clock signal VCLK sets the Q output of the flip-flop U13 to a logical high voltage, closing the switch S10 and opening the switch S20. The signal VRAMP3 begins to rise, but while it is still lower than the signal VEAO2, the output of the comparator U6 is low which maintains the Q output of the flip-flop U13 at a logical high voltage. When the signal VRAMP3 exceeds the level of the signal VEAO2, the output of the comparator becomes a logical low voltage, resetting the flip-flop U13 such that the Q output is a logical low voltage. This opens the switch S10 and closes the switch S20. Then, upon a next clock pulse of the clock signal VCLK, the Q output is set to a logical high voltage and the cycle repeats.

Figure 10:
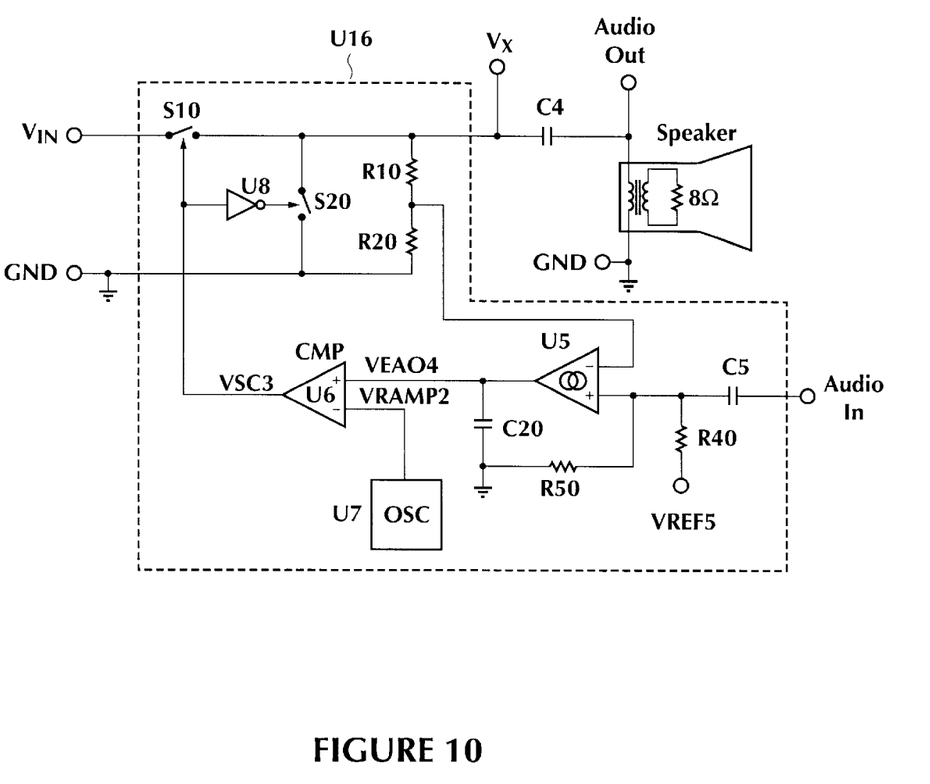
FIG. 10 illustrates a schematic diagram of a third alternate embodiment of a buck converter according to the present invention.

FIG. 10 illustrates a schematic diagram of a third alternate embodiment of a buck converter according to the present invention. Rather than having an inductor L10, capacitor C10 and load resistance RL1O as in FIG. 4, FIG. 10 illustrates a first terminal of a capacitor C4 coupled to the node Vx. A second terminal of the capacitor C4 is coupled to a first terminal of a speaker, forming a node AUDIO OUT. A second terminal of the speaker is coupled to the ground node. In addition, a first terminal of a capacitor C5 is coupled to an AUDIO IN node. A second terminal of the capacitor C5 is coupled to the inverting input of the comparator U5, to a first terminal of a resistor R40 and to a first terminal of a resistor R50. A second terminal of the resistor R40 is coupled to a reference voltage VREF5. A second terminal of the resistor R50 is coupled to the ground node.

When a variable signal is applied to the node AUDIO IN, the output voltage at the node AUDIO OUT is representative of the variable signal. Therefore, the buck converter functions as a power amplifier because a load coupled to the output node AUDIO OUT can draw current in excess of that supplied by the source of the variable signal. Such a power amplifier can be implemented in an integrated circuit having only four pins; a first pin for the supply node Vin; a second pin for the ground node GND; a third pin for the node Vx; and a fourth pin for the node AUDIO IN.

Note the buck converter according to the present invention can sink current as well as source current. This is necessary for powering the speaker because the speaker is AC coupled to the buck converter through the capacitor C4. The power amplifier can amplify an audio signal by applying the audio signal to the node AUDIO IN with a speaker coupled to the output node. Alternately, the power amplifier can control a motor coupled to the output node Vo. In such case the motor speed is adjusted by adjusting the level of the voltage applied to the non-inverting input of the transconductance amplifier U5. Other applications for this aspect of the invention will be apparent. In FIG. 10, it will be apparent that the polarities of the inputs of the transconductance amplifier U5 can be reversed along with the inputs of the comparator U6. Further, the transconductance amplifier U5 can be replaced with another type of amplifier, such as an operational amplifier, with appropriate compensation, as illustrated in FIG. 7.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A method of supplying power to a load device comprising the steps of:

a. drawing power from a supply for forming an output voltage wherein the step of drawing power comprises alternately raising a first terminal of a first energy storage element to a first voltage level for charging the first energy storage element and lowering the first terminal of the first energy storage element to a second voltage level for discharging the first energy storage element into a second energy storage element coupled to a second terminal of the first energy storage element thereby forming the output voltage across the second energy storage element, wherein the first voltage level is higher than the output voltage level and the output voltage level is higher than the second voltage level; and b. forming an error signal that is representative of a difference between a desired output voltage and an average of a voltage level on the first terminal of the first energy storage element for controlling the step of drawing power from the supply.

2. The method according to claim 1 wherein the desired output voltage is constant.

3. The method according to claim 1 wherein the desired output voltage is variable.

4. The method according to claim 1 wherein the step of forming the error signal comprises a step of charging a third energy storage element with a current wherein the current is representative of a difference between the voltage level on the first terminal of the first energy storage element and the desired output voltage and wherein the error signal is a voltage level across the third energy storage element.

5. The method according to claim 1 wherein the step of forming the error signal comprises a step of charging a capacitor with a current wherein the current is representative of a difference between the voltage level on the first terminal of the first energy storage element and the desired output voltage and wherein the error signal is a voltage level across the capacitor.

6. The method according to claim 4 further comprising a step of comparing the error signal to a ramp signal for forming a switch control signal wherein a duty cycle of the switch control signal affects the output voltage level.

7. An apparatus for drawing power from an input source and supplying a voltage to a load device, comprising:
   a. a first energy storage element having a first terminal and a second terminal;
   b. a switch for controlling charging of the first energy storage element with a current and discharging the first energy storage element wherein the switch is coupled to the first terminal of the first energy storage element;
   c. a second energy storage element coupled to the second terminal of the first energy storage element; and
   d. means for forming an error signal coupled to the first terminal of the first energy storage element.

8. The apparatus according to claim 7 wherein the switch and the means for forming are implemented in an integrated circuit package having three pins wherein a first pin is coupled to a first terminal of the switch, a second pin is coupled to a second terminal of the switch and a third pin is coupled to a ground node.

9. The apparatus according to claim 7 further comprising means for comparing the error signal to a periodic ramp signal for controlling a duty cycle of the switch, the means for comparing coupled to the means for forming.

10. The apparatus according to claim 7 wherein the first energy storage element comprises an inductor and the second energy storage element comprises a capacitor.

11. The apparatus according to claim 7 wherein the first energy storage element comprises a capacitor and the second energy storage element comprises an inductor.

12. The apparatus according to claim 11 further comprising an audio speaker coupled to the inductor.

13. The apparatus according to claim 11 further comprising an electric motor coupled to the inductor.

14. The apparatus according to claim 7 wherein the means for forming comprises:
   a. an amplifier having a first input terminal, a second input terminal and an output terminal wherein the first input terminal of the amplifier is coupled to the first terminal of the first energy storage element and the second input terminal of the amplifier is coupled to receive a first signal;
   b. a third energy storage element coupled to the output of the amplifier.

15. The apparatus according to claim 14 further comprising a comparator having a first input terminal, a second input terminal and an output terminal wherein the first input terminal of the comparator is coupled to the first terminal of the third energy storage element and the second input terminal of the comparator is coupled to receive a second signal and wherein the output terminal of the comparator is coupled to control the first switch.

16. The apparatus according to claim 14 wherein the switch and the means for forming are implemented in an integrated circuit package having four pins wherein a first pin is coupled to a first terminal of the switch, a second pin is coupled to a second terminal of the switch, a third pin is coupled to a ground node and a fourth pin is coupled to the second input terminal of the amplifier.

17. The apparatus according to claim 15 wherein the second signal is a periodic ramp signal.

18. An apparatus for drawing power from an input source and supplying a voltage to a load device, comprising:
   a. a first switch having a first terminal and a second terminal wherein the first terminal is coupled to receive a supply voltage;
   b. a first energy storage element having a first terminal and a second terminal wherein a first terminal of the first energy storage element is coupled to the second terminal of the first switch;
   c. a second switch having a first terminal and a second terminal wherein the first terminal of the second switch is coupled to the first terminal of the first energy storage element and the second terminal of the second switch is coupled to a ground node;
   d. a second energy storage element having a first terminal and a second terminal wherein the first terminal of the second energy storage element is coupled to the second terminal of the first energy storage element and the second terminal of the second energy storage element is coupled to the ground node;
   e. a voltage monitoring circuit coupled to the first terminal of the first energy storage element and coupled to control the first switch based upon a time average of a voltage at the first terminal of the first energy storage element.

19. The apparatus according to claim 18 wherein the first switch, the second switch and the voltage monitoring circuit are implemented in an integrated circuit package having three pins wherein a first pin is coupled to the first terminal of the first switch, a second pin is coupled to the second terminal of the first switch and a third pin is coupled to the second terminal of the second switch.

20. The apparatus according to claim 18 wherein the voltage monitoring circuit comprises:
   a. an amplifier having a first input terminal, a second input terminal and an output terminal wherein the first input terminal of the amplifier is coupled to the first terminal of the first energy storage element and the second input terminal of the amplifier is coupled to receive a first signal;
   b. a third energy storage element coupled to the output of the amplifier;
   c. a comparator having a first input terminal, a second input terminal and an output terminal wherein the first input terminal of the comparator is coupled to the first terminal of the third energy storage element and the second input terminal of the comparator is coupled to receive a second signal and wherein the output terminal of the comparator is coupled to control the first switch.

21. The apparatus according to claim 18 wherein the voltage monitoring circuit is coupled to control the second switch.

22. The apparatus according to claim 18 wherein the first energy storage element comprises an inductor and the second energy storage element comprises a capacitor.

23. The apparatus according to claim 18 wherein the first energy storage element comprises a capacitor and the second energy storage element comprises an inductor.

24. The apparatus according to claim 23 further comprising an audio speaker coupled to the inductor.

25. The apparatus according to claim 23 further comprising an electric motor coupled to the inductor.

26. The apparatus according to claim 20 wherein the first signal is a predetermined reference signal.

27. The apparatus according to claim 20 wherein the first signal is a variable signal.

28. The apparatus according to claim 20 wherein the first signal is a combined predetermined reference signal and a variable signal.

29. The apparatus according to claim 20 wherein the switch and the means for forming are implemented in an integrated circuit package having four pins wherein a first pin is coupled to the first terminal of the first switch, a second pin is coupled to the second terminal of the first switch, a third pin is coupled to the second terminal of the second switch and a fourth pin is coupled to the second input terminal of the amplifier.

30. The apparatus according to claim 20 wherein the second signal is a periodic ramp signal.

31. A method of supplying power to a load device comprising the steps of:
 a. drawing power from a supply for forming an output voltage wherein the step of drawing power comprises alternately raising a first terminal of a inductor to a first voltage level for charging the inductor and lowering the first terminal of the inductor to a second voltage level for discharging the inductor into a first capacitor coupled to a second terminal of the inductor thereby forming the output voltage across the first capacitor, wherein the first voltage level is higher than the output voltage level and the output voltage level is higher than the second voltage level; and
 b. forming an error signal that is representative of a difference between a desired output voltage and an average of a voltage level on the first terminal of the inductor for controlling the step of drawing power from the supply.

32. The method according to claim 31 wherein the desired output voltage is constant.

33. The method according to claim 31 wherein the desired output voltage is variable.

34. The method according to claim 31 wherein the step of forming the error signal further comprises a step of charging a second capacitor with a current wherein the current is representative of a difference between the voltage level on the first terminal of the inductor and the desired output voltage and wherein the error signal is a voltage level across the second capacitor.

35. The method according to claim 34 further comprising a step of comparing the error signal to a ramp signal for forming a switch control signal wherein a duty cycle of the switch control signal affects the output voltage level.

36. A method of supplying power to a load device comprising the steps of:
 a. drawing power from a supply for forming an output voltage wherein the step of drawing power comprises alternately raising a first terminal of a first capacitor to a first voltage level for charging the first capacitor and lowering the first terminal of the first capacitor to a second voltage level for discharging the first capacitor into an inductor coupled to a second terminal of the first capacitor thereby forming the output voltage across the inductor, wherein the first voltage level is higher than the output voltage level and the output voltage level is higher than the second voltage level; and
 b. forming an error signal that is representative of a difference between a desired output voltage and an average of a voltage level on the first terminal of the first capacitor for controlling the step of drawing power from the supply.

37. The method according to claim 36 wherein the desired output voltage is constant.

38. The method according to claim 36 wherein the desired output voltage is variable.

39. The method according to claim 36 further comprising a step of driving an audio speaker with the output voltage.

40. The method according to claim 36 further comprising a step of driving an electric motor with the output voltage.

41. The method according to claim 36 wherein the step of forming the error signal further comprises a step of charging a second capacitor with a current wherein the current is representative of a difference between the voltage level on the first terminal of the first capacitor and the desired output voltage and wherein the error signal is a voltage level across the second capacitor.

42. The method according to claim 41 further comprising a step of comparing the error signal to a ramp signal for forming a switch control signal wherein a duty cycle of the switch control signal affects the output voltage level.

* * * * *

UNITED STATES PATENT AND TRADEMARK OFFICE
CERTIFICATE OF CORRECTION

PATENT NO. : 5,818,207

DATED : October 6, 1998

INVENTOR(S) : Jeffrey Hwang

It is certified that error appears in the above-identified patent and that said Letters Patent is hereby corrected as shown below:

In column 1, line 26, delete "resistor RI." and insert --resistor R1.--.

In column 1, line 30, delete "resistor RI" and insert --resistor R1--.

Signed and Sealed this

Ninth Day of March, 1999

Attest:

Q. TODD DICKINSON

*Attesting Officer*   Acting Commissioner of Patents and Trademarks